T. Witmer.
Horse Rake.
Nº 49673.  Patented Aug. 29, 1865.
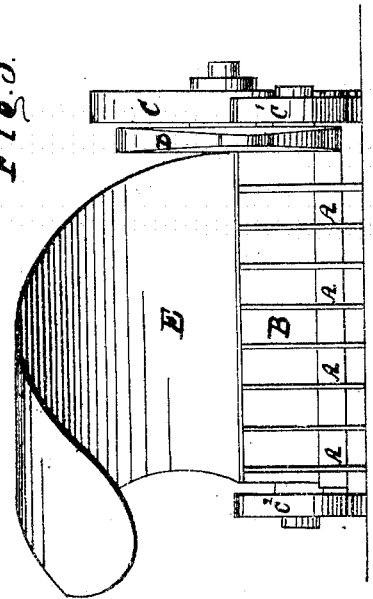
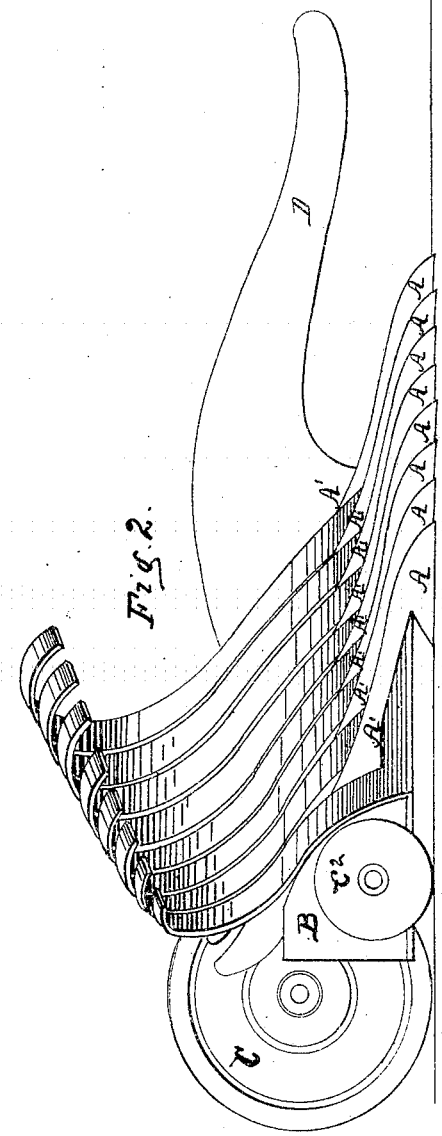
Witnesses:
C. D. Smith
W. F. Hall
T. Witmer
By Munn & Co
Attorneys

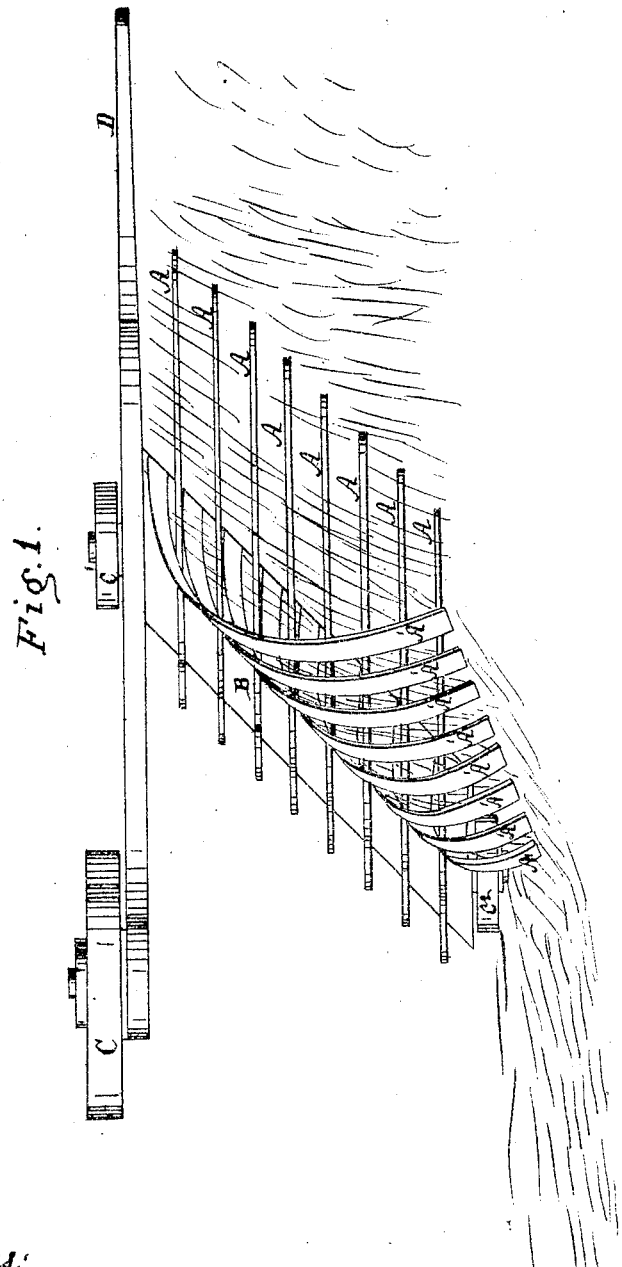

UNITED STATES PATENT OFFICE.

TOBIAS WITMER, OF WILLIAMSVILLE, NEW YORK.

IMPROVEMENT IN HORSE-RAKES.

Specification forming part of Letters Patent No. 49,673, dated August 29, 1865.

*To all whom it may concern:*

Be it known that I, TOBIAS WITMER, of Williamsville, in the county of Erie and State of New York, have invented a new and useful Improvement in Hay-Rakes; and I do hereby declare the following to be a full, clear, and exact description of the same, reference being had to the accompanying drawings, making part of this specification, in which—

Figure 1 is a plan of a rake illustrative of my invention. Fig. 2 is a side elevation thereof. Fig. 3 is a front view of the same, and embodies a modification.

Similar letters of reference indicate corresponding parts in the several figures.

My invention relates to the class of rakes which form the windrow in a line parallel with the path traveled by the machine; and the improvement consists in a novel manner of arranging and attaching the gathering fingers or teeth.

The following description will enable others skilled in the branch of manufacture to which my invention appertains to fully understand and use the same.

A A A represent a series of gathering fingers or teeth, pivoted to the beam B and projecting forward so as to take up the hay as the machine passes along. The fingers are attached in such manner as to be allowed the necessary vibratory movement to conform to the inequalities of the ground. These fingers or gatherers A are so arranged that the plane of their upper edges is inclined at a suitable angle toward one side of the machine to cause the hay to slide off continuously as fast as it is received.

If preferred, the office of the gatherers or teeth may be to simply take up the hay from the ground and deliver it to an inclined concave, E, as in Fig. 3; but in Figs. 1 and 2 the strips or pieces A', attached to the fingers A, extend backward and upward to an extent to adapt them to act as clearers themselves.

The machine thus constituted may run on wheels C C' C², and the horses may be attached to the arm or bar D.

Two machines of the construction above stated, or rather the raking portions of two such machines, may be arranged to work side by side, so as to throw the hay in opposite directions, and thus make the windrow between them.

The fingers may be held down to their work by means of suitable springs adapted to permit the fingers to yield and override obstacles. It is my intention to arrange the teeth to work behind the beam B instead of in front thereof, as above described.

One advantage of this mode of raking consists in forming the windrow so as to be taken up in hauling by the wagon passing along its side upon the unraked hay, the scatterings thus falling so as to be taken into the next row formed, finishing the whole operation in the middle of the field, and requiring but one raking of the field and making cleaner work than by two rakings in the ordinary mode. Another advantage consists in forming the windrow into a more compact roll, for the purpose of cocking, than can be done in the ordinary mode, as the hay may for that purpose be rolled or raked together from opposite directions, bringing two rolls or windrows together, similar to the back furrow turned by a plow in plowing greensward.

Having thus described my invention, the following is what I claim as new and desire to secure by Letters Patent:

1. The pivoted inclined teeth A A, in combination with their carrying-beam B, the wheels C C' C², and arm or tongue D, all constructed and arranged in the manner and for the purposes specified.

2. In combination with the above, the inclined concave E, arranged and employed substantially in the manner and for the purpose explained.

To the above specification of my improved mode of raking hay I have signed my hand this 27th day of May, 1865.

TOBIAS WITMER.

Witnesses:
 CHARLES D. SMITH,
 W. F. HALL.